Feb. 27, 1923.
J. L. MOHUN.
BRAKE BEAM SUPPORT AND BRAKE SHOE RELEASE DEVICE.
FILED DEC. 8, 1921.
1,446,855.
3 SHEETS—SHEET 2.
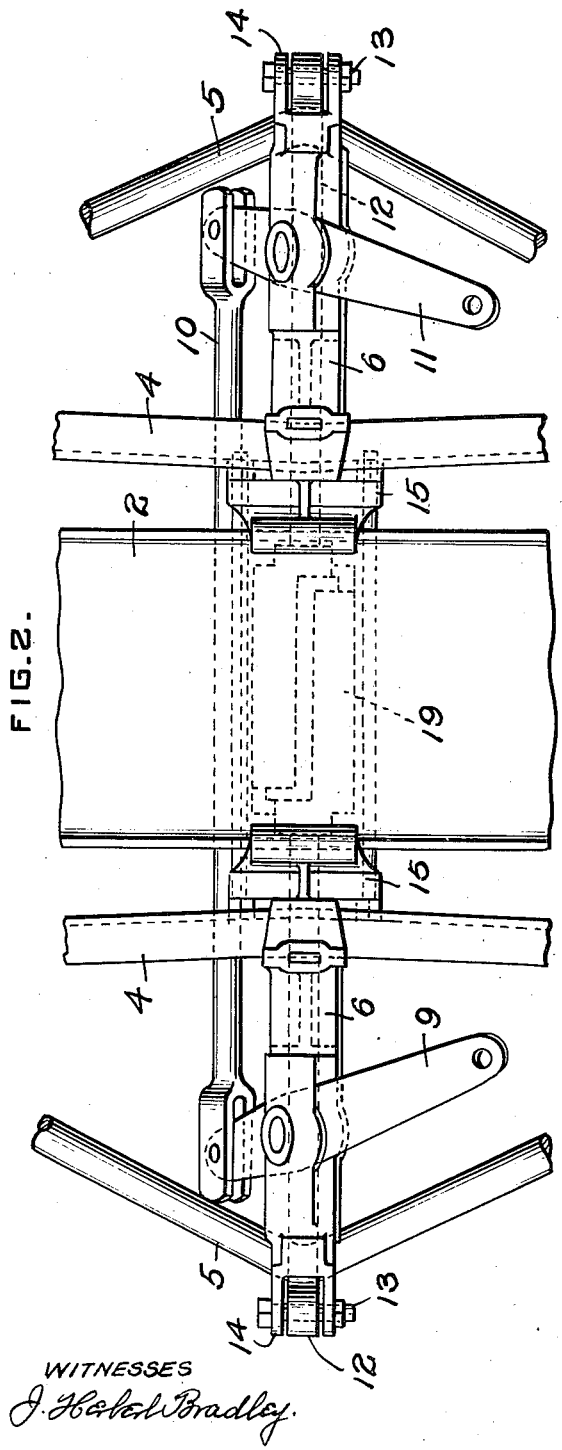
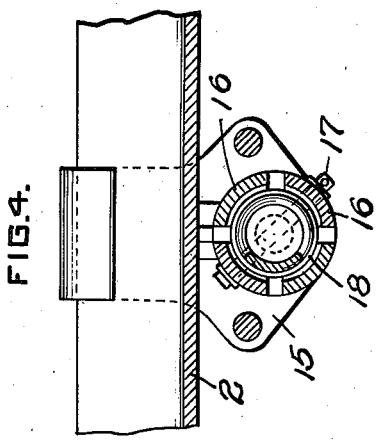
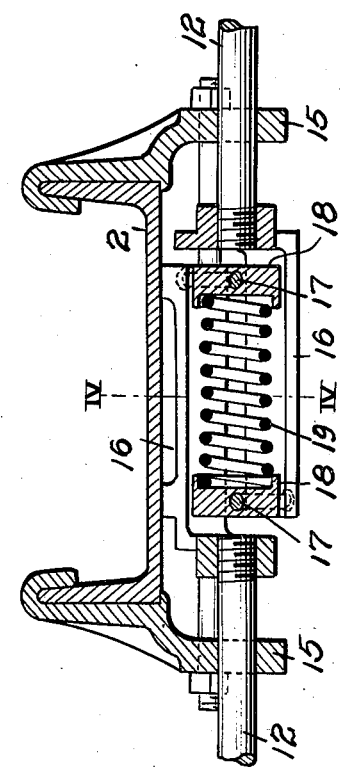
INVENTOR
John L. Mohun
By Winter & Brown
his attys
WITNESSES
J. Herbert Bradley

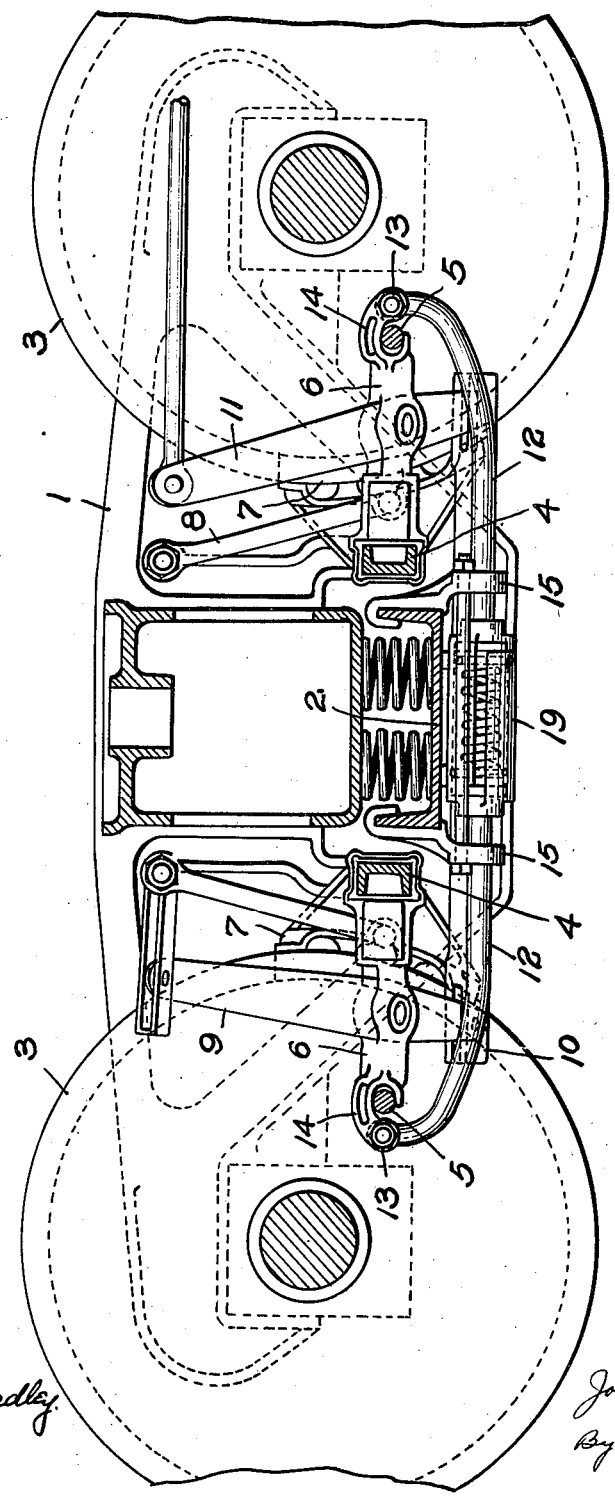

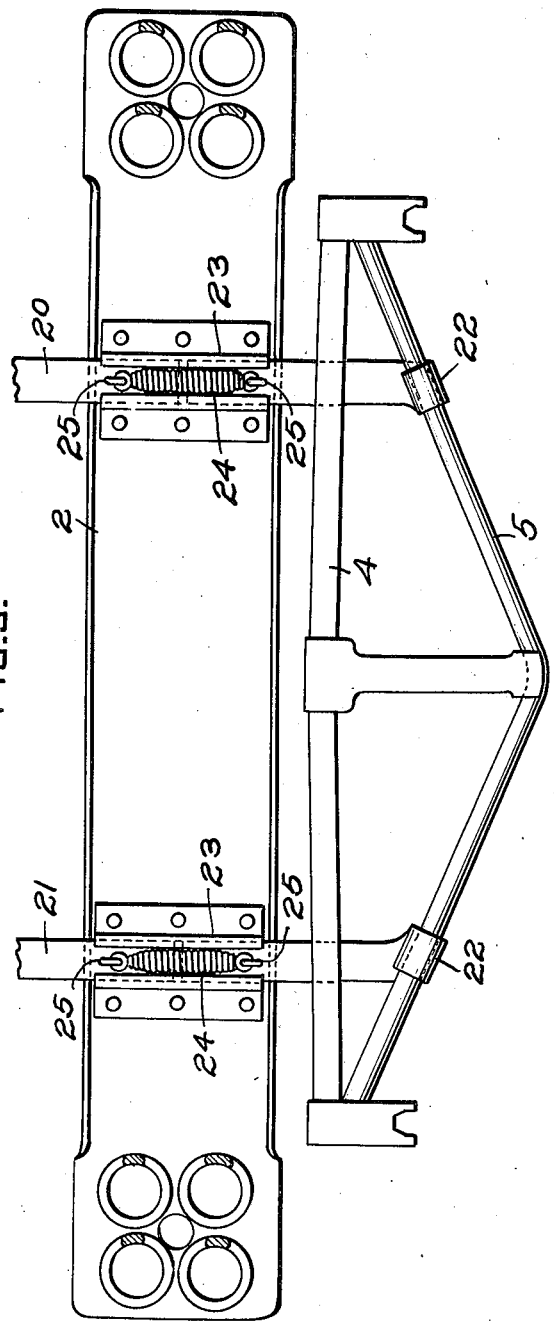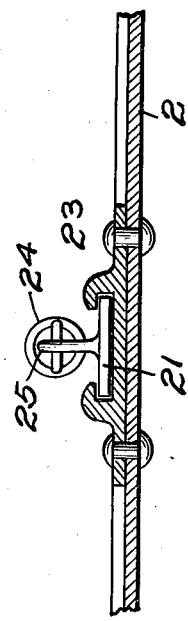

Patented Feb. 27, 1923.

1,446,855

UNITED STATES PATENT OFFICE.

JOHN L. MOHUN, OF OMAHA, NEBRASKA.

BRAKE-BEAM SUPPORT AND BRAKE-SHOE-RELEASE DEVICE.

Application filed December 8, 1921. Serial No. 520,880.

*To all whom it may concern:*

Be it known that I, JOHN L. MOHUN, a citizen of the United States, and a resident of Omaha, in the county of Douglas and State of Nebraska, have invented a new and useful Improvement in Brake-Beam Supports and Brake-Shoe-Release Devices, of which the following is a specification.

This invention relates to railway brake devices, and more particularly to a device forming a third point of support for the brake beam, a shoe guide, and an automatic brake shoe releasing device.

In railway car brake mechanisms as generally applied on four wheeled trucks, the brake beams lie between the wheels, are suspended from the truck frame by suitable swinging hangers and are themselves connected to the live and dead brake levers which in turn are connected by a connecting rod so that both brake beams move in unison. In such brake mechanism the brake shoes are released from the wheels solely by gravity action due to the fact that the brake hangers are in inclined position, as a result of which the brake shoes frequently drag on the wheels. Furthermore since the brake beams are merely pivotally connected to the hangers, the beams and shoes can tilt so that the upper ends of the shoes come into contact with the wheels and become worn off thus reducing their effective braking surfaces. Furthermore in case the hangers break there is nothing to prevent the brake beams from falling onto the track.

It has heretofore been proposed to provide a third point of support for the brake beams, so arranged as to hold the shoes so that they will not wear unequally, and so that in case the hangers break the brake beams will nevertheless be prevented from falling onto the track.

The device of the present invention has the advantages just above named, and in addition provides for automatically and positively releasing the brake shoes from the wheels.

In the accompanying drawings Fig. 1 is a longitudinal central section through one form of four wheeled railway car truck, showing the invention applied thereto; Fig. 2 is a plan view of the same; Fig. 3 is an enlarged sectional detail view of the central portion of the brake beam and the connecting rods; Fig. 4 is a vertical section through the same on the line IV—IV, Fig. 3; and Figs. 5 and 6 are detailed views illustrating a modification.

In the drawings 1 indicates the truck side frame, 2 the spring plank and 3 the car wheels. The brake beams are illustrated as of the trussed type, comprising the compression member 4, tension member 5 and strut 6. The brake shoes 7 are secured to the ends of these beams in the usual way. 8 indicates the brake hangers, which may be arranged as is customary, 9 indicates the dead brake lever, 10 the brake lever connecting rod, and 11 the live brake lever, all of which can be of any of the usual constructions, and whose functions and operations are well understood.

The improved device comprises a pair of rods 12 secured at their outer ends to any suitable portion of the brake beams, such as being connected by bolts 13 to jaws 14 formed on the inner ends of the struts 6 of the brake beams,—the opposite ends of said rods 12 being slidably and yieldingly connected to the spring plank. As shown, brackets 15 are secured to the opposite edges of the spring plank and are provided with openings through which the rods 12 extend. The portions of the rods between the brackets 15 are telescopically connected in any suitable way, and have a spring arranged between them so as to normally draw both rods in the direction of the spring plank. This telescopic connection can be made in various ways. As shown, each of the rods has connected to it a jaw comprising two oppositely arranged parallel arms 16, each arm being less than a quadrant of a circle so that the arms 16 of one jaw lie between the arms 16 of the other jaw, and in a manner to permit movement of the jaws longitudinally of each other. Secured between the free ends of the arms of each jaw, such as by means of a pin 17, is a washer or disk 18 which forms in effect a crosshead between the arms of the jaw. Between the washers 18 of the two jaws is located a helical spring 19, which is under sufficient compression to hold the two jaws in fully telescoped position, and consequently, through the arms 12, to move the brake beams and brake shoes away from the wheels.

Since the rods 12 pass through openings in the brackets 15 on the spring plank, the attachment of the outer ends of the rod 12 to the tension side of the brake beams forms a third point of support for said beams, so that the brake shoes cannot sag downwardly and consequently are held in such position that they will wear equally, that is, equally from their lower to their upper ends, and not become worn away at their upper ends as frequently occurs where no such third point of support is provided. Furthermore this third point of support forms a safety factor in case the brake hangers should break, namely, to prevent the brake beam from falling down onto the track. Since the spring 19 is normally under compression, both rods 12 are normally pulled in a direction to pass farther underneath the spring plank, with the result that the brake shoes are not only positively released from the wheels but are held positively away therefrom. When the brakes are applied, in the usual way, to draw the brake shoes against the wheels, the spring 19 yields so as to permit the rods 12 to move outwardly to accommodate themselves to the movement of the brake beams.

The construction described provides an automatic and positive release for the brake shoes, in addition to providing a third point of support for the brake beam and thereby forming a positive guide for the brake shoes to hold them at all times with their faces in proper relation to the treads of the wheels.

The construction as illustrated is capable of various modifications. Figs. 5 and 6 show a modification in which two such brake beam supporting devices are illustrated, at 20 and 21 respectively, these being located on opposite sides of the central longitudinal plane of the truck. As here shown each of these devices comprises a pair of arms or bars, the outer ends of which are suitably attached, at 22, to the tension members 5 of the brake beams. The arms in this case are shown as of rectangular cross section and their inner ends are slidably mounted in overhanging guides 23 secured to the top of the spring plank 2, and said arms are normally biased to move toward each other by means of helical springs 24 attached at their opposite ends to suitable studs 25 on the rods 20 and 21. These springs 24 are normally under tension, and thus have the same effect as has the compression spring 19 in the form shown in Figs. 3 and 4. Various other modifications will readily suggest themselves to the skilled worker.

All forms are designed to not only form an additional support or supports for the brake beam and a guide for the brake beam to hold the brake shoes from tilting or canting, but also to serve as an automatic release of the brake shoes from the wheels.

I claim:

1. A car truck comprising a spring plank, a brake beam carrying brake shoes, a movable supporting rod disposed below and connected to the beam and means for urging the rod in a direction to release the said shoes.

2. A car truck comprising a spring plank, a brake beam carrying brake shoes, a supporting rod slidable on the spring plank having its outer end connected to the beam and located below the same, and means forcing the said rod in a direction to release the shoes.

3. In combination in a car truck with a spring plank and a brake beam, of a suspension rod slidably supported at its inner end and disposed below the beam, the said rod being guided in a substantially horizontal plane and having its outer end pivoted to the beam whereby to guide the beam, to provide a third point of support, and to prevent the same falling to the track in case of breakage.

4. In combination in a car truck with a spring plank and a brake beam carrying brake shoes, of a suspension rod supported by and slidable on the spring plank below the beam and having its outer end pivoted thereto, and means for urging the rod inwardly to release the said shoes.

5. In combination in a car truck with a spring plank and a brake beam carrying brake shoes, of a suspension rod disposed below the beam and having its outer end pivoted thereto, means for supporting the inner end of said rod for sliding movement and means for constantly pressing the rod inwardly to release the said shoes.

6. In combination in a car truck with a spring plank and brake beams carrying brake shoes, of a pair of suspension rods disposed below the beams having their outer ends pivoted to the respective beams, means for slidingly supporting the inner ends of the rods and a spring urging the inner ends of both said rods inwardly to release the shoes.

7. In combination in a car truck with a spring plank and brake beams carrying brake shoes, of a pair of suspension rods disposed below the beams having their outer ends pivoted to the respective beams to form a third point of support, means for slidingly supporting the inner ends of the rods on the spring plank and a spring urging the inner ends of both said rods inwardly to release the shoes.

8. In combination in a car truck with a spring plank and brake beams carrying brake shoes, of hangers depending from the plank, a pair of oppositely projecting suspension rods having their inner ends slidingly supported in the hangers, said rods extending below the brake beams and pivoted at their outer ends thereto to form a third point of support, and a spring engaging both said rods to urge the same inwardly to release the brake shoes.

9. In combination in a car truck with a spring plank and brake beams carrying brake shoes, of hangers depending from the planks, a pair of oppositely projecting suspension rods having their inner ends slidingly supported in the hangers, said inner ends being provided with interlocking telescopic jaws, a spring housed therein for urging the rods inwardly to release the brake shoes, said rods extending below the brake beams and pivoted at their outer ends thereto to form a third point of support.

10. In combination in a car truck with a spring plank and brake beams carrying brake shoes, of a pair of suspension rods disposed below the beams having their outer ends pivoted to the extremity of the center strut of the respective beams, means for slidingly supporting the inner ends of the rods on the spring plank, said inner ends telescopically engaging each other to form a housing, and a spring within the housing whereby the said rods are urged inwardly to release the shoes.

In testimony whereof, I sign my name.

JOHN L. MOHUN.

Witnesses:
J. H. ASHBY,
J. A. WALKER.